(12) United States Patent
McDonald

(10) Patent No.: US 10,128,643 B2
(45) Date of Patent: Nov. 13, 2018

(54) LOOM ASSEMBLY PROVIDING IMPROVED ELECTRICAL ISOLATION

(71) Applicant: ILLINOIS TOOL WORKS INC., Glenview, IL (US)

(72) Inventor: Randy McDonald, Sussex, WI (US)

(73) Assignee: Illinois Tool Works Inc., Glenview, IL (US)

( * ) Notice: Subject to any disclaimer, the term of this patent is extended or adjusted under 35 U.S.C. 154(b) by 19 days.

(21) Appl. No.: 15/655,437

(22) Filed: Jul. 20, 2017

(65) Prior Publication Data

US 2018/0109090 A1    Apr. 19, 2018

Related U.S. Application Data

(60) Provisional application No. 62/407,662, filed on Oct. 13, 2016.

(51) Int. Cl.
*H02G 3/04* (2006.01)
*H01B 7/00* (2006.01)

(52) U.S. Cl.
CPC ......... *H02G 3/0468* (2013.01); *H01B 7/0045* (2013.01); *H02G 3/0406* (2013.01); *H02G 3/0418* (2013.01); *H02G 3/0456* (2013.01); *H02G 3/0481* (2013.01)

(58) Field of Classification Search
USPC ........................................ 138/156
See application file for complete search history.

(56) References Cited

U.S. PATENT DOCUMENTS

| | | | | |
|---|---|---|---|---|
| 727,786 | A * | 5/1903 | Grace | B65D 3/04 138/156 |
| 790,644 | A * | 5/1905 | Lloyd | B21D 39/04 138/156 |
| 1,185,014 | A * | 5/1916 | Shea | E04D 1/22 138/156 |
| 1,993,965 | A * | 3/1935 | Huck | F16L 11/15 138/128 |
| 3,341,803 | A * | 9/1967 | Bustamante | F21V 19/0005 191/23 R |
| 4,214,147 | A * | 7/1980 | Kraver | F28F 19/006 392/468 |
| 4,218,814 | A * | 8/1980 | Hodapp | B29C 63/18 138/121 |
| 4,379,473 | A * | 4/1983 | Kunze | B29C 61/10 138/103 |
| 4,766,662 | A * | 8/1988 | Bradshaw | F01P 11/04 138/151 |
| 5,160,811 | A * | 11/1992 | Ritzmann | F16L 3/015 138/121 |
| 5,322,480 | A * | 6/1994 | Meier | F16G 13/16 174/97 |
| 5,518,447 | A * | 5/1996 | Nordin | B08B 15/002 104/52 |
| 5,905,231 | A | 5/1999 | Houte et al. | |
| 5,967,194 | A | 10/1999 | Martin | |

(Continued)

*Primary Examiner* — William H Mayo, III
*Assistant Examiner* — Krystal Robinson
(74) *Attorney, Agent, or Firm* — Boyle Fredrickson, S.C.

(57) ABSTRACT

A flexible, electrically insulating insert fits in a slit of a split loom tube to substantially increase the electrical path length between cables contained within the split loom tubing and the outside environment to provide improved electrical resistance therebetween.

16 Claims, 4 Drawing Sheets

(56) References Cited

U.S. PATENT DOCUMENTS

| | | | | |
|---|---|---|---|---|
| 6,129,120 | A * | 10/2000 | Margot | H02G 3/0468 138/121 |
| 6,274,813 | B1 * | 8/2001 | Houte | B60R 16/0215 174/68.3 |
| 6,706,968 | B2 * | 3/2004 | Yaworski | H02G 3/0481 174/74 A |
| 6,948,241 | B2 * | 9/2005 | Tadokoro | H02G 3/0468 174/102 D |
| 9,252,576 | B2 | 2/2016 | Okuhara et al. | |
| 9,601,909 | B2 * | 3/2017 | Gronowicz, Jr. | H02G 3/0468 |
| 2008/0092974 | A1 * | 4/2008 | Gleeson | F16L 9/17 138/156 |
| 2016/0040803 | A1 * | 2/2016 | Steeger | F16G 13/16 248/49 |
| 2017/0363229 | A1 * | 12/2017 | Barten | F16L 3/015 |

\* cited by examiner

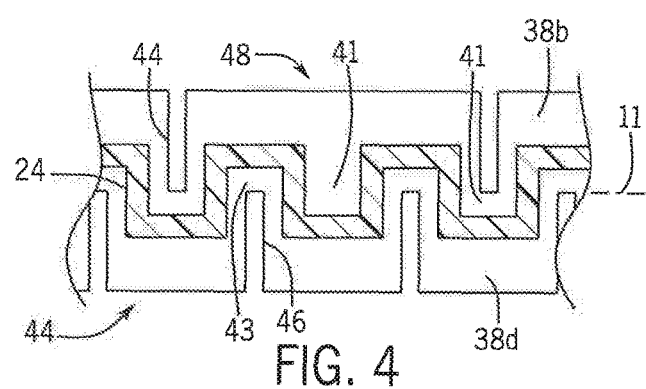
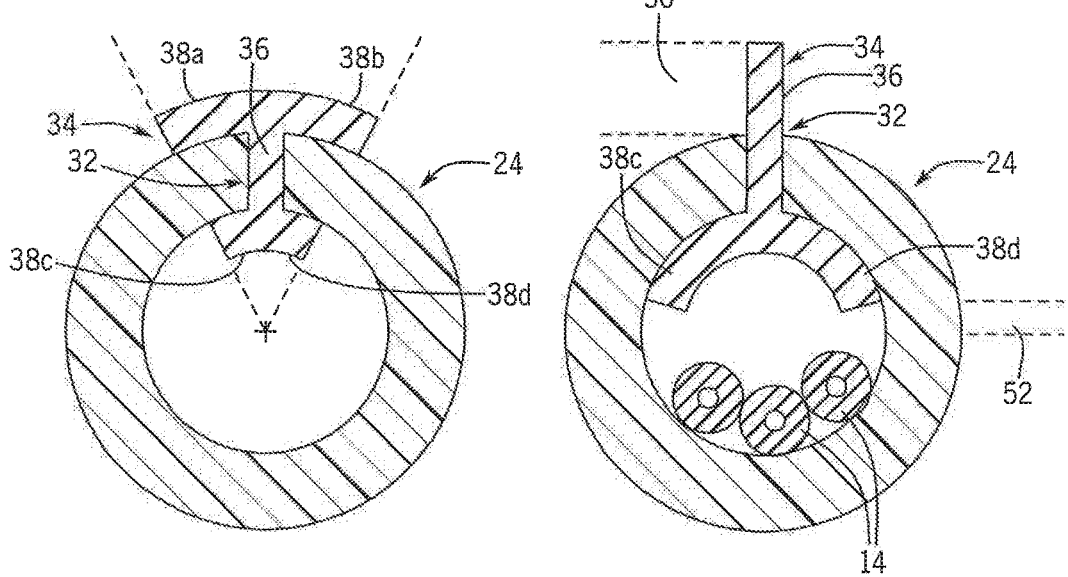

LOOM ASSEMBLY PROVIDING IMPROVED ELECTRICAL ISOLATION

CROSS-REFERENCE TO RELATED APPLICATIONS

This application claims the benefit of U.S. provisional application 62/407,662 filed Oct. 13, 2016, and hereby incorporated by reference in its entirety.

FIELD OF THE INVENTION

The present invention relates to wiring harnesses for collecting wires into a single flexible bundle and in particular to a split loom tubing assembly providing improved electrical isolation.

BACKGROUND OF THE INVENTION

Wiring harnesses are employed, for example, in appliances such as dishwashers and washing machines, to collect and guide individual electrical wires between connection points. Such harnesses, for example, may be terminated on one or both ends by a releasable electrical connector or other connector system to permit parallel, multipoint connections for individual wires of the harness.

Although the conductors of the individual wires in the harness are each insulated, often the wires of the harness may be further protected by a tubular harness insulator positioned around the wires. One type of tubular harness insulator provides a tubular loom that is cut (split) longitudinally through one tube wall so that the loom may be installed on the wires, the latter passing through the cut eliminating the need to thread the wires through the tubular loom. Frequently the tubular loom has corrugated walls formed of annular concave and convex sections such as improves the flexibility of the tubular loom while nevertheless providing it with resistance to radial compression or crushing.

The tubular loom thus serves to collect the individual wires of the harness and to provide mechanical protection to those wires, for example, against getting pinched or caught in other mechanisms of the appliance or similar device.

While generally the resilience of the split tubular loom serves to hold together the edges of the tube on either side of the split, it is known in the art to provide additional mechanisms for holding the tube walls closed, for example, as taught in U.S. Pat. Nos. 5,967,194 and 5,905,231 both incorporated by reference. Reduction of the flexibility of the split loom tube may be provided by installing a rigid element along the split that passes through the tube that engages opposite edges of that cut, for example, as taught by U.S. Pat. No. 9,252,576.

SUMMARY OF THE INVENTION

The present invention provides a harness assembly using a split loom tube and offering substantially improved electrical isolation through the use of an insulating collar receiving the edges of the split in the split loom tube to increase the shortest path length of electrical current flowing between the inside and outside of the loom. The collar is flexible to minimize interference with the routing of the harness and may closely engage the loom walls to prevent conductors from sliding in between the collar and the loom such as might reduce that electrical path length.

Specifically, in at least one embodiment, the invention provides a wire harness having a split loom tube providing an electrically insulating tube extending along a length and having a slot cut in one wall of the tube also extending along the length. A flexible insert provides an electrically insulating radial wall fitting between edges of the slot to extend lengthwise therealong, the radial wall extending circumferentially in opposite directions at a proximal end to provide an inner circumferential wall fitting against an inner wall of the tube adjacent to the slot, the flexible insert operating to flex with flexure of the split loom tube.

It is thus a feature of at least one embodiment of the invention to provide a simple method of augmenting common split loom tubes to increase the electrical isolation provided by such tubes.

The flexibility of the flexible insert to bending of a lengthwise axis of the flexible insert may be no less than a flexibility of the split loom tube to bending of a lengthwise axis of the split loom tube.

It is thus a feature of at least one embodiment of the invention to provide an insert that improves electrical isolation but does not adversely affect the flexibility of the tube and thus the ability to route the split loom tube along complex pathways during installation such as may require momentary flexure.

The flexible insert may be substantially straight in length in a relaxed state.

It is thus a feature of at least one embodiment of the invention to provide a flexible insert that is easily manufactured and applicable to a wide variety of routing tasks.

The circumferential wall may sit against the inner wall of the tube so as to preclude the introduction of electrical conductors having a diameter greater than $\frac{1}{16}$ of an inch from passing between the flexible insert and inner wall of the tube.

It is thus a feature of at least one embodiment of the invention to increase the electrical path length between contained conductors and the outside of the split loom tube.

The electrical path between the flexible insert and the split loom tube, from inside of the split loom yet outside of a space between a circumferential wall and the inner wall of the tube, to the outside of the split loom tube, may be greater than one-quarter inch.

It is thus a feature of at least one embodiment of the invention to provide a high degree of electrical insulation beyond that guaranteed by a normal split loom tube.

The circumferential inner wall and circumferential outer wall may subtend an angle of at least 10 degrees about a center of the split loom tube.

It is thus a feature of at least one embodiment of the invention to increase the electrical path length near the slit in the split loom tube.

The circumferential inner wall may subtend an angle of at least 120 degrees about a center of the split loom tube.

It is thus a feature of at least one embodiment of the invention to provide an insert that is self-centering within the split loom tube.

The distal end of the radial wall may provide an outer circumferential wall fitting against an outer wall of the tube adjacent to the slot.

It is thus a feature of at least one embodiment of the invention to further increase the electrical path length while firmly gripping the edges of the slit in the split loom tube.

The split loom tube may be corrugated and a separation between the inner circumferential wall and outer circumferential wall maybe substantially equal to a radial depth of corrugations of the split loom tube.

It is thus a feature of at least one embodiment of the invention to provide a system that works with commonly available corrugated split loom tubing.

The radially extending wall may include a set of slots extending radially inward from the distal end of the radially extending wall to promote lengthwise flexibility.

It is thus a feature of at least one embodiment of the invention to increase the flexibility of the flexible insert without adversely affecting electrical isolation.

The inner and outer circumferential walls have portions fitting into corrugations of the split loom tube.

It is thus a feature of at least one embodiment of the invention to provide improved sealing of the interior of the split loom tube.

The split loom tube may provide circumferential corrugations alternating between lesser diameter and greater diameter portions along the length of the tube and the split loom tube provides a portion about the slot that is not corrugated.

It is thus a feature of at least one embodiment of the invention to provide an improved type of split loom tubing having reduced resistance to the insertion of a flexible insert.

The corrugations may provide walls extending along the length and walls extending at an angle canted with respect to the length in a relaxed state.

It is thus a feature of at least one embodiment of the invention to provide a split loom tube that has reduced "catch points" with respect to installing the flexible insert.

The split loom tube may include a portion opposite the slot providing reduced resistance to deformation of this split loom tube to separate edges of the slot.

It is thus a feature of at least one embodiment of the invention to reduce a force of separation of the edges of the split for better insertion of the flexible insert.

The flexible insert may be extruded thermoplastic.

It is thus a feature of at least one embodiment of the invention to provide a flexible insert design amenable to low-cost production methods.

The inner circumferential wall may extend beyond the length of the radial wall for at least one end of the flexible insert.

It is thus a feature of at least one embodiment of the invention to provide a flexible insert that is compatible with connector systems that clamp on the outside of the split loom tubing.

Other features and advantages of the invention will become apparent to those skilled in the art upon review of the following detailed description, claims and drawings in which like numerals are used to designate like features.

BRIEF DESCRIPTION OF THE DRAWINGS

FIG. 4 is a figure similar to FIG. 3 showing an alternative embodiment where the collar engages the corrugations of the loom and provides flexibility-enhancing axial slots;

FIG. 5 is a figure similar to that of FIG. 2 showing an alternative cross-section of the collar;

FIG. 6 is a figure similar to that of FIG. 5 showing an alternative cross-section of the collar for faster installation;

Figure 1:
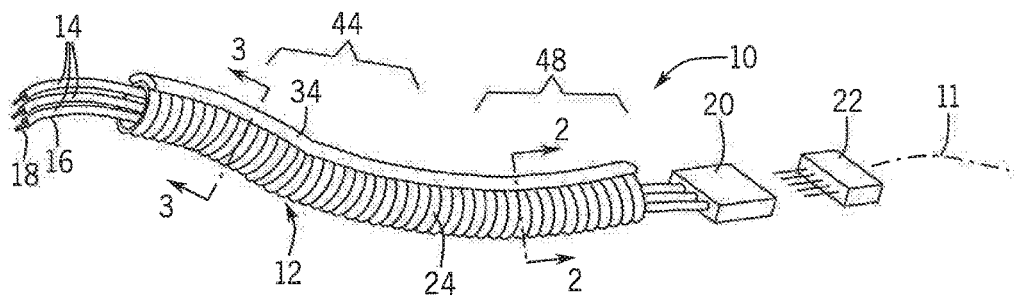
FIG. 1 is a perspective view of a wiring harness providing high electrical isolation per the present invention containing insulated conductors terminated at one end with an electrical connector.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a wire harness 10 may provide a high electrical resistance loom assembly 12 providing a central lumen extending generally along a longitudinal axis 11. The central lumen may receive and corral multiple electrical wires 14 extending longitudinally therethrough. Each wire 14 provides an insulating outer coating 16 and a central conductive metal core 18, for example, of copper. The ends of the wires 14 may extend outward from each end of the high electrical resistance loom assembly 12 for direct connection to various electrical components or connection to a releasable electrical connector 20 releasably connecting to a mating connector 22, for example, on an appliance component or the like.

Figure 2:
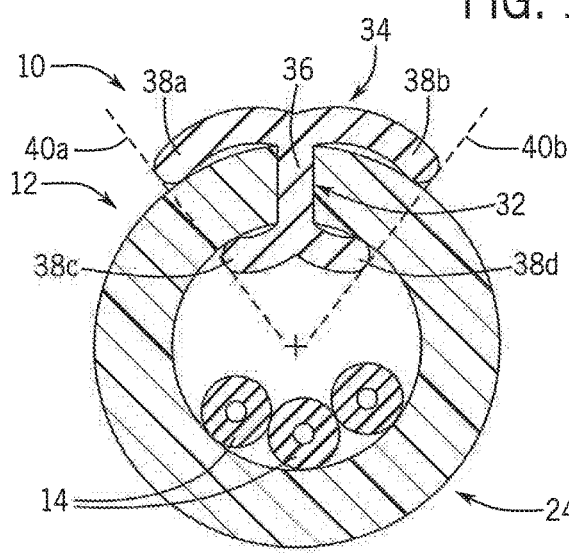
FIG. 2 is a cross-section along line 2-2 of FIG. 1 showing a first embodiment of the harness of FIG. 1 showing a corrugated split loom tube interfitting with an insulating collar increasing the electrical path length through the corrugated split loom tube.
Figure 3:
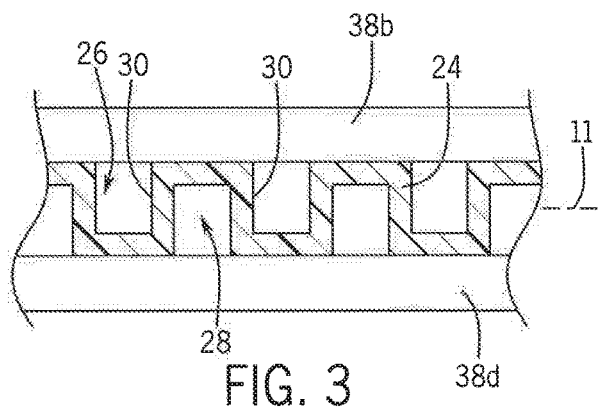
FIG. 3 is a fragmentary cross-section along line 3-3 of FIG. 1 showing a sliding interface between the collar and the corrugations of the loom to allow longitudinal sliding therebetween.

Referring also to FIGS. 2 and 3, the high electrical resistance loom assembly 12 may provide for a corrugated split loom tube 24 having a generally circular cross-section perpendicular to the longitudinal axis 11 formed by adjacent segments of outwardly convex rings 26 and adjacent outwardly concave rings 28 arranged in alternating fashion along the longitudinal axis 11. As will be understood to those of ordinary skill in the art, radial wall sections 30 shared between adjacent outwardly convex rings 26 and concave rings 28 promote flexibility of the corrugated split loom tube 24 with respect to bending along the longitudinal axis 11 while resisting radial compression perpendicular to the longitudinal axis 11.

The corrugated split loom tube 24 may have a longitudinal slot 32 through one wall extending along a longitudinal axis 11 allowing opening of the corrugated split loom tube 24 for the insertion of wires 14 therein through the slot 32. This opening is possible with a slight flexure of the outer circumferential walls of the corrugated split loom tube 24 to separate the edges of the slot 32.

A longitudinally extending flexible insert 34 may be received within the slot 32 and provides radially extending bar 36 passing through the slot 32 between the inside of the corrugated split loom tube 24 and the outside of the corrugated split loom tube 24 along the length of the corrugated split loom tube 24. Outer wings 38a and 38b of an outer circumferential wall extend circumferentially in opposite directions from the outer end of the radially extending bar 36 so that the wings 38a and 38b may curve outward and back to contact an outer surface of the corrugated tube 24 on either side of the slot 32 at distal ends of the wings 38a and 38b. Likewise, inner wings 38c and 38d of an inner circumferential wall may extend circumferentially in opposite directions from the inner end of the radially extending bar 36 so that distal ends of the wings 38c and 38d curve back to contact an inner surface of the corrugated split loom tube 24 on either side of the slot 32. Generally, the distal ends of the wings 38a and 38c may align along a common radius 40a from the center of the corrugated split loom tube 24, and the distal ends of the wings 38b and 38d may align along a separate common radius 40b from the center of the corrugated split loom tube 24, the radius 40a and 40b having an angular separation of more than 10 degrees or in some embodiments at least 20 degrees. A path from the outside of the corrugated split loom tube 24 and outside of the flexible insert 34 to the inside of the corrugated split loom tube 24, past the inside of the flexible insert 34 through the slot 32, and passing only along spaces between or interfaces between the flexible insert 34 and the corrugated split loom tube 24 will be greater than one-quarter inch.

The circumferential wall formed by wings 38c and 38d maybe held closely to the inner wall of the split loom tube 24 so as to preclude electrical wires 14 from passing into the space between the wings 38c and 38d and the inner wall of the split loom tube 24 when the outside diameter of the electrical wires 14 (including insulation) is greater than 1/16 of an inch.

Generally, the material of the flexible insert 34 will be flexible, for example, constructed of a polymer elastomer such as polypropylene or nylon so as to permit flexure of the harness 10. Ideally the bulk properties of the material of the flexible insert 34 have a greater flexibility than the bulk properties of the material of the split loom tube 24. In this way, the flexibility of the harness 10 when loaded with wires 14 will be within 20 percent, and ideally within 10 percent of the flexibility of the corrugated split loom tube 24 with the wires 14 but without the flexible insert 34. When the flexible insert 34 is assembled to the corrugated split loom tube 24, the corrugated split loom tube 24 retains its bending capability, for example, providing a radius of curvature of less than 10 inches in diameter and freely flexing between that curvature and straight. The flexible insert 34, in some embodiments, may be manufactured by extrusion, and in these and other embodiments may extend along a straight axis 11 in a relaxed state.

As shown in FIG. 3, longitudinal contact between the outer wing 38a and 38b and the outer surface of the corrugated split loom tube 24 may be along a plane allowing sliding between these two materials, and similar sliding may be provided between the inner wings 38c and 38d along the inner surface, of the corrugated split loom tube 24 to promote flexure that require such sliding. Alternatively, flexure of the harness 10 may be provided solely by the elasticity of the material of the flexible insert 34 along longitudinal axis 11.

Referring now to FIG. 4, in an alternative embodiment, the outer wings 38a and 38h may provide inwardly extending annular teeth 41 which may engage the outwardly concave surfaces of the corrugated split loom tube 24 to eliminate a gap therebetween and any axial sliding. Circumferential, flexure-promoting slots 42 may be cut axially inward, across the longitudinal axis 11 and through the outer wings 38a and 38b, to promote flexure in some areas 44 or to reduce flexure in some areas 48 so that controlled flexure may be provided along the length of the harness 10 particularly for use as a strain relief at the ends of the harness 10. These annular teeth 41 may likewise enforce a predefined curvature in the harness 10 by providing a slightly increased or decreased axial periodicity with respect to the axial periodicity of the outwardly convex rings 26.

Likewise, the inner wings 38c and 38d may provide outwardly extending annular teeth 43 which may engage the outwardly concave surfaces of the corrugated split loom tube 24 so as to eliminate a gap therebetween and axial sliding. Circumferential flex-promoting slots 46 may be cut axially outward through the inner wings 38c and 38d to promote flexure. As with the circumferential slots 42, the slots 46 can also be used to control axial flexibility at different locations along the length of the harness 10 and to promote curvature. The teeth 41 or 43 may also be given a slight wedge-shape so as to press fit within, the corresponding concave or convex surfaces of the corrugated split loom tube 24.

Referring now to FIG. 5, in one embodiment the outer wings 38a and 38b may contact the outer surface of the corrugated split loom tube 24 not just at the distal ends of the outer wings 38a and 38b but over the entire distance from the slot 32 to those distal ends. Likewise, the inner wings 38c and 38d may contact the inner surface of the corrugated split loom tube 24 both at the distal ends of the inner wings 38c and 38d and over the entire distance from the slot to those distal ends.

Referring now to FIG. 6, in an alternative embodiment, the outer wings 38a and 38b may be removed, and the radially extending bar 36 may be extended further radially outside of the outer diameter of the corrugated split loom tube 24 by a distance 50. In addition, the inner wings 38c and 38d may extend around a greater portion of the inner circumference of the corrugated split loom tube 24 (for example, by more than 120 degrees about the center of the split loom tube 24) to be positioned within a distance 52 of a diameter (for example, less than ¼ of an inch or preferably less than one ⅛ of an inch) of the corrugated split loom tube 24, the latter representing a point of maximum width for expansion of the wings 38c and 38d within the corrugated split loom tube 24. Generally, then, the natural outward resilience of the wings 38c and 38d resists further inward motion of the flexible insert 34 by more than distance 52 ensuring that the radially extending bar 36 remains positioned in the slot 32. The greater extent of the wings 38c and 38d ensures a large creepage distance even without the wings 38a and 38b. Further inward motion may also be prevented by the existence of the wires 14.

It will be understood that the flexible insert 34, when assembled to the corrugated split loom tube 24, substantially increases the "creepage" distance being the minimum distance of electrical flow along a path between the corrugated split loom tube 24 and the flexible insert 34 from any conductor placed outside of the assembly of the flexible insert 34 and tube 24 and any conductor placed inside the assembly of the flexible insert 34 and corrugated tube 24 in an unbroken volume with electrical wires 14. The flexible insert 34 may provide for sufficient resilience to interlock with the tube 24 so as to retain the assembled form. The flexible insert 34 may be installed on the tube 24 at the same time that the wires 14 are installed within the tube 24.

Figure 7:
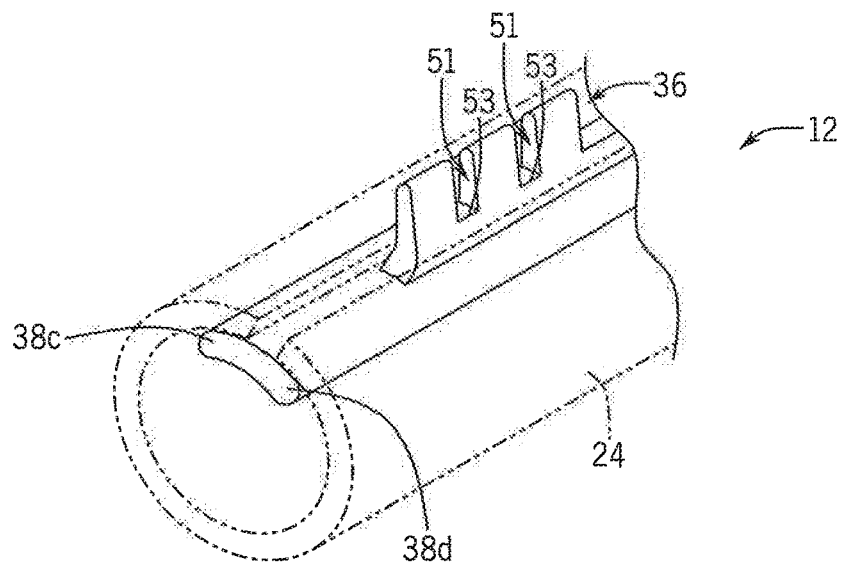
FIG. 7 is a fragmentary perspective view of the collar of FIG. 6.

Referring now to FIG. 7, the radially extending bar 36 may incorporate periodically spaced, radially inwardly extending slots 51 terminating at a depth 53 outside of the slot 32 so as to have no adverse effect on electrical isolation but to improve the flexibility of the assembly along longitudinal axis 11. The spacing and location of the slots 51 may be varied to control the flexibility of the corrugated split loom tube 24 at different points along its length.

Figure 8:
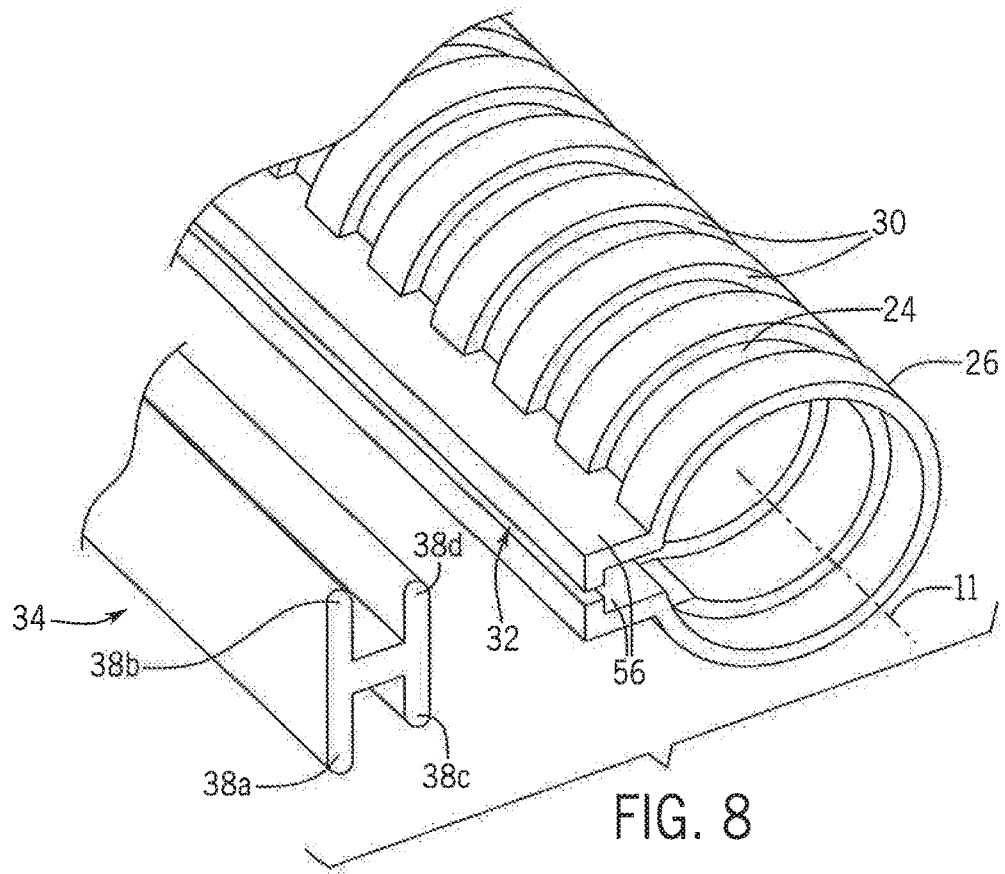
FIG. 8 is a fragmentary perspective view of an alternative loom design providing for less interference in inserting the collar.

Referring now to FIG. 8, installation of the flexible insert 34 in the corrugated split loom tube 24 (shown here separated before assembly) may be simplified through a specially designed corrugated split loom tube 24 having non-corrugated portions 56 flanking the slot 32 providing reduced resistance to insertion of the flexible insert 34 and sliding of the flexible insert 34 along the axis 11 such as promotes flexibility of the corrugated split loom tube 24.

Figure 9:
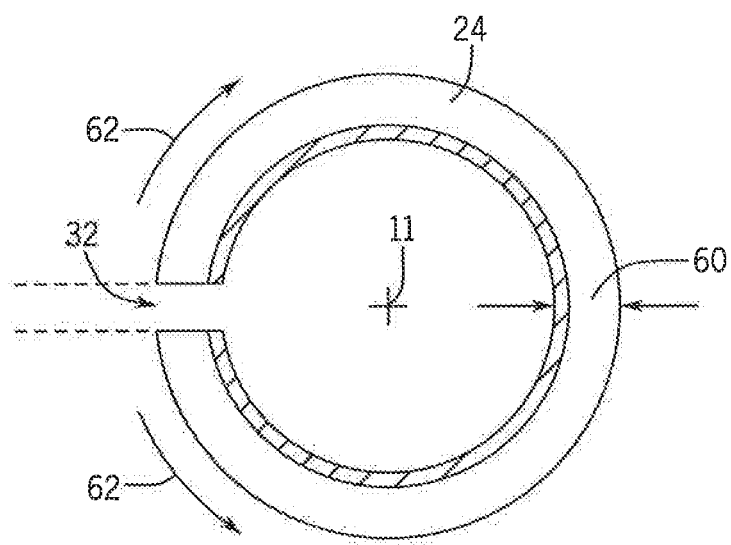
FIG. 9 is a cross-section similar to that of FIG. 2 showing the providing of a reduced thickness of the loom on one side to improve flexibility for insertion of the collar.

Referring now to FIG. 9, installation of the flexible insert 34 may be further improved by providing a reduced thickness wall 60 on the corrugated split loom tube 24 extending lengthwise along the axis 11 and positioned 180 degrees around the axis of the corrugated split loom tube 24 from the slot 32 such as reduces the force of separating the edges of the slot shown by arrow 62 for installation of the flexible insert 34 (not shown in FIG. 9).

Figure 10:
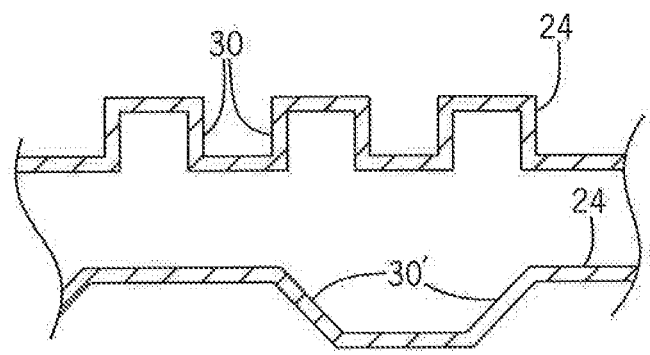
FIG. 10 is a figure showing two alternative corrugations patterns of the loom with one providing axially lengthened corrugations having sloped radial walls for reduced resistance in insertion of the collar.

Referring now to FIG. 10, an additional innovation in the corrugated split loom tube 24 may provide that the radial wall sections 30 be canted to form radial wall sections 30' reducing sharp corners that would tend to catch the outer walls of the radially extending bar 36 such as may make it difficult to install the flexible insert 34 or reduce axial sliding such as promotes flexibility of the assembly 12.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. A wire harness assembly comprising:
   a split loom tube providing an electrically insulating corrugated tube extending along a length and having a slot cut in one wall of the tube also extending along the length, the split loom tube providing a resilience holding together edges of the slot; and
   a flexible insert providing an electrically insulating radial wall fitting between edges of the slot to extend lengthwise therealong, the radial wall extending circumferentially in opposite directions at a proximal end of the radial wall to provide an inner circumferential wall fitting against an inner wall of the tube adjacent to the slot, the flexible insert operating to flex with flexure of the split loom tube.

2. The wire harness assembly of claim 1 wherein a flexibility of the flexible insert to bending of a lengthwise axis of the flexible insert is no less than a flexibility of the split loom tube to bending of a lengthwise axis of the split loom tube.

3. The wire harness assembly of claim 1 wherein the flexible insert is substantially straight in length in a relaxed state.

4. The wire harness assembly of claim 1 wherein the circumferential wall sits against the inner wall of the tube so as to preclude an introduction of electrical conductors having a diameter greater than ¹⁄₁₆ of an inch from passing between the flexible insert and an inner wall of the tube.

5. The wire harness assembly of claim 1 wherein the electrical path between the flexible insert and the split loom tube from inside of the split loom, yet outside of a space between a circumferential wall and the inner wall of the tube, to the outside of the split loom tube is greater than one-quarter inch.

6. The wire harness assembly of claim 1 wherein the circumferential inner wall and circumferential outer wall subtend an angle of at least 10 degrees about a center of the split loom tube.

7. The wire harness assembly of claim 6 wherein the circumferential inner wall subtends an angle of at least 120 degrees about a center of the split loom tube.

8. The wire harness assembly of claim 1 wherein a distal end of the radial wall provides an outer circumferential wall fitting against an outer wall of the tube adjacent to the slot.

9. The wire harness assembly of claim 8 wherein a separation between the inner circumferential wall and outer circumferential wall is substantially equal to a radial depth of corrugations of the split loom tube.

10. The wire harness assembly of claim 1 wherein the radial wall includes a set of slots extending radially inward from a distal end of the radially extending wall to promote lengthwise flexibility.

11. The wire harness assembly of claim 1 wherein at least one of the inner and outer circumferential walls have portions fitting into corrugations of the split loom tube.

12. The wire harness assembly of claim 1 wherein the split loom tube provides circumferential corrugations alternating between lesser diameter and greater diameter portions along the length of the tube and wherein the split loom tube provides a portion about the slot that is not corrugated.

13. The wire harness assembly of claim 1 wherein the split loom tube provides circumferential corrugations alternating between lesser diameter and greater diameter portions along the length of the tube and wherein the corrugations provide walls extending along the length and walls extending at an angle canted with respect to the length in a relaxed state.

14. The wire harness assembly of claim 1 wherein the split loom tube includes a portion opposite the slot providing reduced resistance to deformation of this split loom to separate edges of the slot.

15. The wire harness assembly of claim 1 wherein the flexible insert is extruded thermoplastic.

16. The wire harness assembly of claim 1 wherein the inner circumferential wall extends beyond a length of the radial wall at least one end of the flexible insert.

* * * * *